Dec. 25, 1956   B. R. BULKIN   2,775,686
INTERNALLY ILLUMINATED KNOB
Filed Feb. 17, 1954
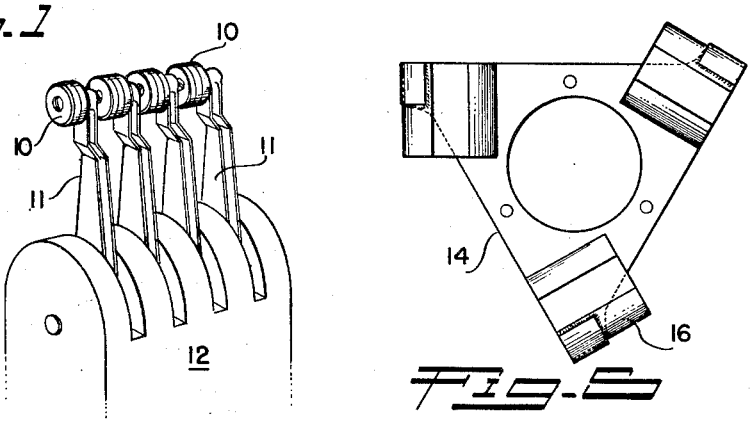
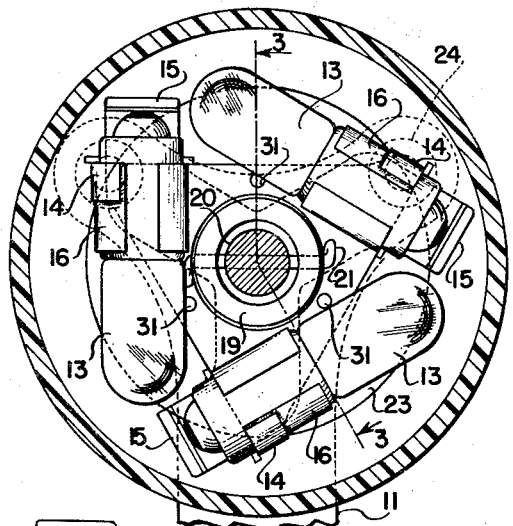
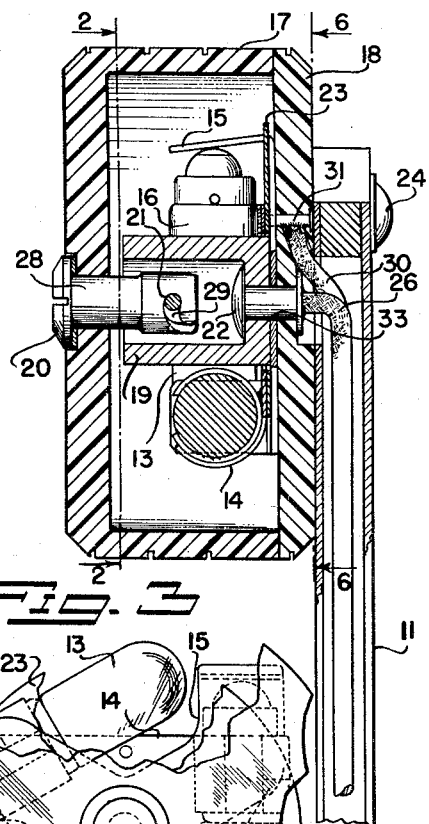
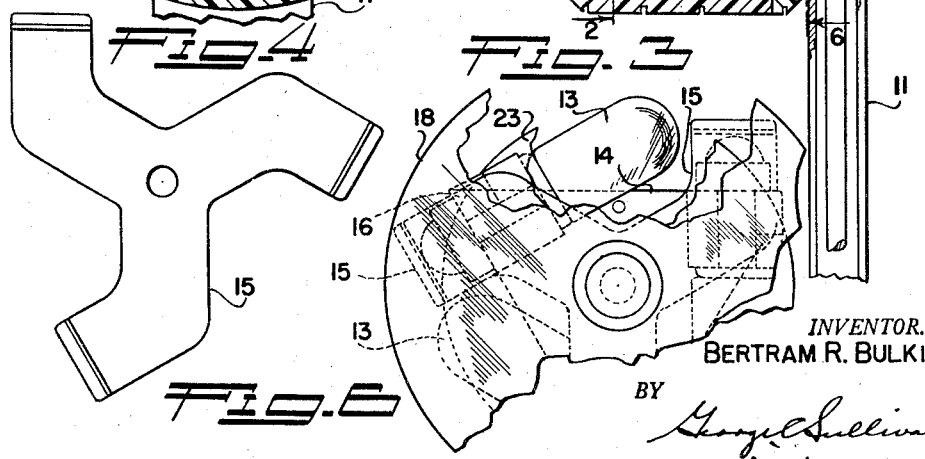
INVENTOR.
BERTRAM R. BULKIN
BY
Agent

United States Patent Office 2,775,686
Patented Dec. 25, 1956

2,775,686
INTERNALLY ILLUMINATED KNOB

Bertram R. Bulkin, Los Angeles, Calif., assignor to Lockheed Aircraft Corporation, Burbank, Calif.

Application February 17, 1954, Serial No. 410,811

6 Claims. (Cl. 240—2)

This invention relates to an internally illuminated knob which may be used as a warning device.

The aircraft industry makes liberal use of various types of indicating and warning devices to show in a positive manner the operation or malfunction of whatever equipment the particular indicating or warning device may be associated.

Audible signals may be used where the location of the warning device cannot be seen by aircraft personnel. It is, however, the more common usage to use indicating lights to indicate the operational condition of aircraft components and equipment.

The lights may be colored, as desired, or placed behind colored lens. Whatever arrangement may be desired or dictated by design requirements the primary function is to give the aircraft personnel adequate and positive indication of the operational condition of the associated aircraft equipment. The warning or indication from the light should be of sufficient intensity to attract the crew member's attention. It is often the case that the lights are not of sufficient intensity to overcome light that may be reflected from adjacent aircraft equipment or surfaces. The warning light should also be of great enough intensity to easily overcome high intensity daylight. Insufficient illumination behind a colored lens can often be a serious problem in an aircraft warning system.

The warning lights may be located remotely from the equipment to which they are associated. The lights may be concentrated in one location under the observation of a certain designated crew member. A more favorable location for a warning light, however, is near the crew member that has control of the equipment to which the warning light is attached.

A still more favorable location for a warning light would be as a part of the lever or handle that operates certain aircraft equipment. A warning indication in such a location would be under the immediate control of the operator and would be immediately seen or noticed as quickly as the equipment handle or lever was moved. The immediate attention of the operator to the condition would be assured and corrective actions could be speedier and more positive.

Levers, handles or switches to operate flaps, landing gear, fuel flow, or other devices are located in the aircraft as the design of the aircraft specifies. The location may be in areas of the aircraft which are subjected to high intensity daylight. An illuminated knob attached to a landing gear lever, for instance, subjected to high intensity daylight or reflections from adjacent lights or reflection from aircraft structure should be so designed as to overcome the possibility of a false indication. The hazard of a possible failure to notice a malfunction as indicated by the illuminated knob is one that should be reduced to the realm of improbability.

It is, therefore, an object of this invention to provide a more positive and effective warning device of the character that may be attached to levers or handles or the like.

It is another object of this invention to provide an internally illuminating device that contains sufficient illumination means to give a positive indication in areas subject to high intensity daylight.

It is still another object of this invention to provide an internally illuminated device readily noticed from all directions.

It is a still further object of the invention to provide an internally illuminated device of a transparent material which may be colored to provide various colored light indication.

It is another object of this invention to provide an internally illuminated device that is easily and readily replaced or removed, as may be desired.

Other objects and features of novelty will become apparent from the description of the drawings wherein:

Figure 1 is a drawing of a control stand showing a typical utilization of the invention;

Figure 2 is a view of Figure 3 taken at line 2—2;

Figure 3 is a view of Figure 2 taken at line 3—3;

Figure 4 is a detail view of a part of Figure 2;

Figure 5 is a detail view of a part of Figure 2; and

Figure 6 is a cutaway view of Figure 3 taken at line 6—6.

Referring now to the drawings there is shown, in Figure 1, a typical installation of the knob 10 as it would appear attached to a control arm or lever 11. The said control arm 11 is shown as a part of a familiar and typical control stand installation 12.

In Figure 2 there is shown the arrangement of the lights 13 which are positioned in a triangular form with the base portion of one light 13 near the tip or head of an adjacent light 13.

A base mounting 16 fits snugly about the base of the light 13 and the said base mounting 16 is in turn soldered to the holding bracket 14. The said holding bracket 14 is the means whereby the necessary power to operate the lights 13 is supplied to the base of the lights 13.

A base contact bracket 15, Figure 2, is arranged and positioned so that a portion of the bracket 15 will contact the tip on the base of the light 13. The said base contact bracket 15 is the means whereby the necessary power to operate the lights 13 is supplied.

Positioned between the base contact bracket 15 and the holding bracket 14 is an insulating spacer 23 which is used to keep the base contact bracket 15 and the holding bracket 14 separated and electrically insulated from each other.

Now referring to Figure 3, a fiber mounting tube 19 is shown fastened to the knob base 18 by means of a tubular rivet 22. The open portion of the fiber mounting tube 19 is designed large enough to receive a Dzus fastener, which operation will be hereinafter described. One end of the fiber mounting tube 19 is partially closed, leaving a hole 33 through which the said tubular rivet 22 is inserted.

Returning to Figure 2, the fiber mounting tube 19 is shown with a fastening wire 21 inserted transversely through the open end of the said tube 19. The fastening wire 21 is positioned so that the locking slot of a standard Dzus fastener will become engaged.

The Dzus fastener 20, Figure 3, is shown with the shank 28 of the fastener 20 inserted in the fiber mounting tube 19 until the slot 29 of the Dzus fastener 20 locks with the wire 21, heretofore described. This locking action secures the knob cover 17 to the knob base 18.

There is shown in Figure 3, two conductors 26 and 30 which are the means whereby the necessary electrical energy to energize the lights 13 is furnished. The said conductor 26 is secured to the tubular rivet 22. The rivet 22 also holds in place and makes contact with the base contact bracket 15. Conductor 30 is secured to the rivet 31. The said rivet 31 also holds in position the holding bracket 14, and consequently makes an electrical connection between the conductor 30 and the holding bracket 14. The other ends of the conductors 26 and 30 terminate at a suitable power source and switching equipment (not shown).

Figure 4 shows the configuration of the base contact bracket 15 and Figure 5 shows the configuration of the holding bracket 14. The need for these particular configurations will be hereinafter described.

Figure 6 shows a fragmentary back view of the knob 10 which clearly indicates the location of the light 13 in relation to the base contact bracket 15, the clear insulation disk 23, and the holding bracket 14.

The knob 10 is secured to the handle or lever 11 by the attaching screws 24, Figure 3.

The knob 10 is assembled in the following manner and in the sequential steps now described.

The knob 10 may be colored as desired and may be constructed out of any transparent material that will satisfactorily pass a sufficient amount of illumination to attract notice. The brackets 14 and 15 described herein and shown in Figures 4 and 5 are, in this particular embodiment, constructed of brass, but any satisfactorily electrical conductive material may be used.

The base contact bracket 15 is first positioned on the knob base 18. The clear insulation disk 23 is next placed over the base contact bracket 15. The holding bracket 14 is next placed on and in contact with the clear insulating disk 23 and is secured in place by the rivets 31. The next assembly step is the fastening of the fiber mounting tube to the base 15 by means of the tubular rivet 22. The knob cover 17 can now be placed over and around the assembly and securely locked in place by a half turn of the Dzus fastener 20 which locks with the wire 21. The said wire 21 is a part of the fiber tube installation.

My invention is not to be construed as limited to the details of the illustrative embodiment of my invention shown and described above, except as set forth in the appended claims.

I claim:

1. An internally illuminated knob comprising a light transmitting knob cover and a light transmitting knob base, a plurality of lights arranged within the said knob, a holding bracket of an electrical conductive material affixed to the knob base with attaching means for the said lights, a base contact bracket connected to the knob base having a multiplicity of extensions, said extensions being bent midway their length with the ends of said extensions having a bent portion to contact a portion of the base of the said lights, a transparent insulating material positioned between the said holding bracket and the base contact bracket, a mounting tube attached to the said base, and said mounting tube having attaching means for securing the said knob cover to the said knob base.

2. An internally illuminated knob comprising a translucent knob cover and a translucent knob base, a plurality of lights arranged within the said knob, a holding bracket of an electrical conductive material adjacent the knob base with attaching means for the said lights, a base contact bracket connected to the knob base having a multiplicity of extensions, said extensions being bent midway their length with the ends of said extensions having a bent portion to contact a portion of the base of the said lights, a transparent insulating material positioned between the said holding bracket and the base contact bracket, a mounting tube attached to the said base, said mounting tube having attaching means for securing the said knob cover to the said knob base, and said holding bracket and base contact bracket arranged about the mounting tube to allow the illumination from the said lights to pass through the base of the said internally illuminated knob.

3. An internally illuminated knob comprising, a light transmitting knob cover, a light transmitting knob base, a plurality of lights arranged within the knob, a holding bracket of an electrical conductive material adjacent the knob base, attaching means connected to the holding bracket for mounting the lights, a base contact bracket connected to the knob base having a multiplicity of extensions, the extensions being bent midway their lengths with the ends of the extensions having a bent portion to contact a portion of the base of the lights, a transparent insulating material positioned between the holding bracket and the base contact bracket, a mounting tube attached to the base, and fastening means carried by the knob cover engageable with the mounting tube for securing the knob cover to the knob base.

4. An internally illuminated knob comprising a translucent knob cover, a translucent knob base, a plurality of lights arranged within the knob, a holding bracket of an electrical conductive material adjacent the base, attaching means carried by the holding bracket for mounting the lights, a base contact bracket connected to the knob base having a multiplicity of extensions, the extensions being bent midway their lengths with the ends of the extensions having a bent portion to contact a portion of the base of the lights, a transparent insulating material positioned between the holding bracket and the base contact bracket, a mounting tube attached to the base, fastening means engageable with the mounting tube for securing the knob cover to the knob base, and the holding bracket and base contact bracket arranged about the mounting tube to allow the illumination from the lights to pass through the base of the internally illuminated knob.

5. An internally illuminated knob comprising, a light transmitting knob cover having a cavity, a light transmitting knob base for closing the cavity, a plurality of lights arranged within the cavity of the knob cover, a holding bracket of an electrical conductive material carried by the base within the cavity, attaching means carried by the holding bracket for mounting the lights, a base contact bracket supported by the knob base within the cavity, a multiplicity of extensions being bent midway their lengths with the ends of the extensions having a bent portion to contact a portion of the base of the lights, a light transmitting insulating material disposed between the holding bracket and the base contact bracket, a mounting tube attached to the case engageable with the base contact bracket, fastening means connected to the mounting tube for securing the knob cover to the knob base, and the holding bracket and base contact arranged about the mounting tube so that illumination from the lights passes through the base and cover of the internally illuminated knob.

6. An internally illuminated hollow knob comprising, a pair of light transmitting members, one member of the pair being a base, the other member being a cover for the base, a plurality of lights arranged within the hollow knob, a holding bracket of an electrical conductive material carried on the base member, attaching means carried by the holding bracket for mounting the lights, a base contact bracket engageable with the base member, a multiplicity of extensions, each extension of the multiplicity being bent midway its length with the end of the extension having a bent portion to contact a portion of the base member of the light, a transparent insulating material positioned between the holding bracket and the base contact bracket, a mounting tube attached to the base member, fastening means connected to the mounting tube for securing the cover member to the base member, and the holding bracket and base contact bracket arranged about the mounting tube within the knob hollow to allow the illumination from the light to pass through the pair of members of the internally illuminated knob.

References Cited in the file of this patent

UNITED STATES PATENTS

| 893,214 | Williams et al. | July 14, 1908 |
| 1,548,197 | Kendall et al. | Aug. 4, 1925 |
| 1,629,456 | Pellegrini | May 17, 1927 |
| 2,096,190 | Moeller | Oct. 19, 1937 |

FOREIGN PATENTS

| 633,318 | Great Britain | Dec. 12, 1949 |